United States Patent
Rose et al.

(10) Patent No.: US 12,469,378 B1
(45) Date of Patent: Nov. 11, 2025

(54) TECHNIQUES FOR REMOTE DISARM OF SECURITY SYSTEM

(71) Applicant: SimpliSafe, Inc., Boston, MA (US)

(72) Inventors: Zachary William Rose, Natick, MA (US); Bojan Rajkovic, Salem, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/790,295

(22) Filed: Jul. 31, 2024

Related U.S. Application Data

(63) Continuation of application No. 18/659,317, filed on May 9, 2024.

(51) Int. Cl.
G08B 25/00 (2006.01)

(52) U.S. Cl.
CPC ......... G08B 25/008 (2013.01); G08B 25/001 (2013.01)

(58) Field of Classification Search
CPC ............................ G08B 25/008; G08B 25/001
See application file for complete search history.

(56) References Cited

U.S. PATENT DOCUMENTS

| | | | | |
|---|---|---|---|---|
| 9,113,052 | B1* | 8/2015 | Scalisi | H04N 7/188 |
| 9,277,250 | B2* | 3/2016 | Mariadoss | H04N 7/18 |
| 10,930,130 | B2* | 2/2021 | Horrocks | G08B 19/00 |
| 11,627,289 | B1* | 4/2023 | Siminoff | H04N 7/183 |
| | | | | 348/155 |
| 2008/0284580 | A1* | 11/2008 | Babich | G08B 13/19684 |
| | | | | 340/502 |
| 2009/0200374 | A1* | 8/2009 | Jentoft | G08B 25/008 |
| | | | | 235/382 |
| 2011/0227730 | A1* | 9/2011 | Stevenson | H04M 11/04 |
| | | | | 340/540 |
| 2011/0230161 | A1* | 9/2011 | Newman | H04M 1/72424 |
| | | | | 455/404.1 |
| 2014/0240111 | A1* | 8/2014 | Kleve | G08B 25/016 |
| | | | | 340/426.18 |
| 2015/0269745 | A1* | 9/2015 | Klimer | G06T 7/262 |
| | | | | 382/103 |
| 2016/0071399 | A1* | 3/2016 | Altman | H04M 1/72421 |
| | | | | 340/539.11 |
| 2017/0300751 | A1* | 10/2017 | Teichman | H04N 7/183 |
| 2017/0372597 | A1* | 12/2017 | Saintellemy | G08B 29/16 |
| 2019/0147848 | A1* | 5/2019 | Mai | G10L 15/26 |
| | | | | 181/206 |

(Continued)

Primary Examiner — Curtis J King
(74) Attorney, Agent, or Firm — Finch & Maloney PLLC

(57) ABSTRACT

Security systems and methods. In one example, a method includes receiving, by a computing device, a plurality of milestones indicating events in a security system while the security system is in an alarm state at a location remote from the computing device, the plurality of milestones including first and second milestones indicative of (i) validity of authentication information, and (ii) a request for the security system to exit the alarm state, respectively. The method further includes generating, by the computing device, a command in response to receipt of the first and second milestones, the command including instructions to cause the security system to exit the alarm state upon receipt of the command by at least one device of the security system, and transmitting, by the computing device, the command to the at least one device to cause the security system to exit the alarm state.

20 Claims, 12 Drawing Sheets

(56) References Cited

U.S. PATENT DOCUMENTS

| | | | |
|---|---|---|---|
| 2020/0082679 A1* | 3/2020 | Scalisi | H04M 1/72418 |
| 2020/0374682 A1* | 11/2020 | Newman | G08B 21/0266 |
| 2022/0159443 A1* | 5/2022 | Piantedosi | H04W 4/029 |
| 2022/0319172 A1* | 10/2022 | Ramanathan | G06T 7/246 |
| 2023/0096207 A1* | 3/2023 | Reimer | G08B 25/008 340/4.31 |
| 2024/0296390 A1* | 9/2024 | Pfeiffer | G06N 20/20 |

\* cited by examiner

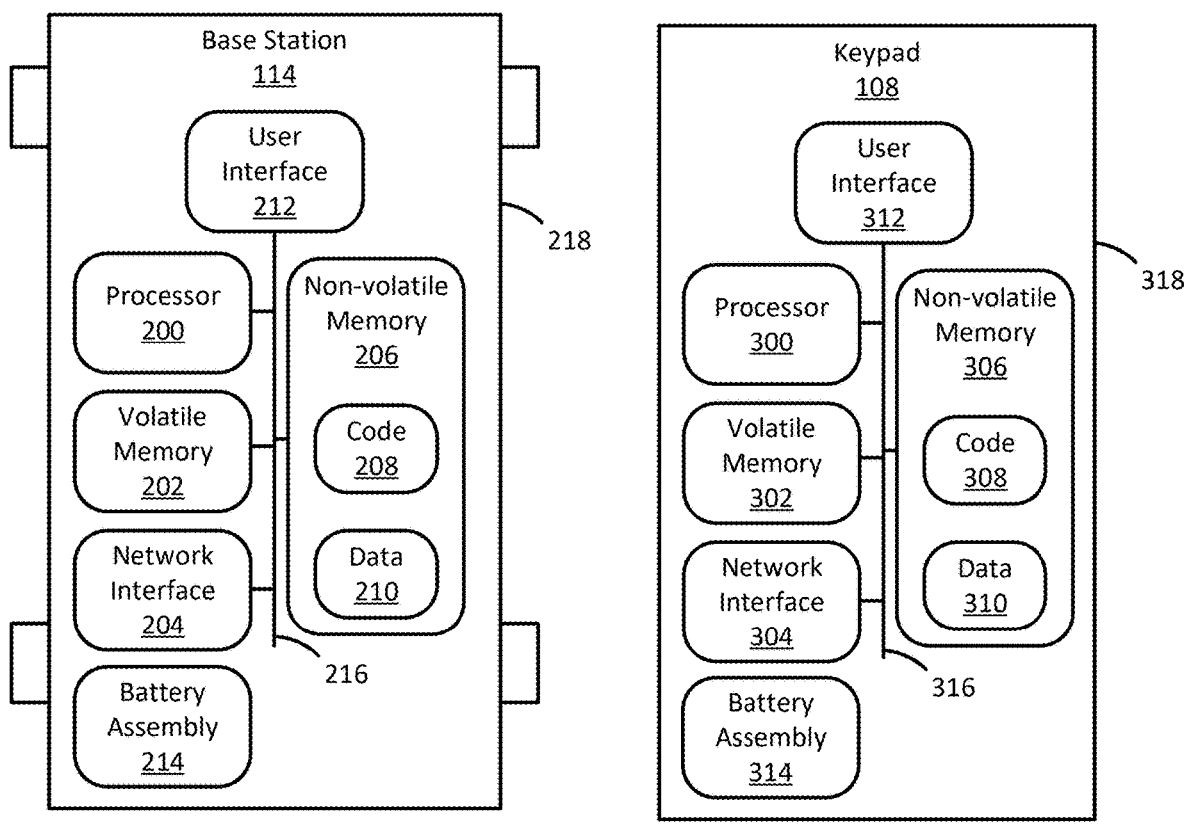

US 12,469,378 B1

TECHNIQUES FOR REMOTE DISARM OF SECURITY SYSTEM

CROSS-REFERENCE TO RELATED APPLICATION

This application is a continuation of, and claims priority under 35 U.S.C. § 120 to, co-pending U.S. application Ser. No. 18/659,317 filed on May 9, 2024, which is hereby incorporated herein by reference in its entirety for all purposes.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for disarming a security system from a remote location based on a verified set of conditions.

According to one embodiment, a method comprises receiving, by a computing device, a plurality of milestones indicating events in a security system while the security system is in an alarm state at a location remote from the computing device, the plurality of milestones including first and second milestones indicative of (i) validity of authentication information, and (ii) a request for the security system to exit the alarm state, respectively, generating, by the computing device, a command in response to receipt of the first and second milestones, the command including instructions to cause the security system to exit the alarm state upon receipt of the command by at least one device of the security system, and transmitting, by the computing device, the command to the at least one device to cause the security system to exit the alarm state.

According to another embodiment, a security system comprises a plurality of devices disposed at a location, the plurality of devices including at least one sensor configured to produce an alarm signal indicating that the security system is in an alarm state, and a computing system remote from the location and hosting an alarm history service. The alarm history service is configured to receive a plurality of milestones including a first milestone and a second milestone, the first milestone indicative of validity of authentication information, and the second milestone indicative of a request for the security system to exit the alarm state. The alarm history service is further configured to generate a command in response to receipt of the first and second milestones, the command including instructions to cause the security system to exit the alarm state upon receipt of the command by the at least one sensor.

Another embodiment is directed to one or more non-transitory computer readable media storing sequences of instructions executable to control a computer system. The sequences of instructions comprise instructions to receive, by the computer system, a plurality of milestones indicating events in a security system while the security system is in an alarm state at a location remote from the computer system, the plurality of milestones including a first milestone indicative of validity of authentication information, and a second milestone indicative of a request for the security system to exit the alarm state, generate, by the computer system, a command in response to receipt of the first and second milestones, the command including instructions to cause the security system to exit the alarm state upon receipt of the command by at least one device of the security system, and transmit, by the computer system, the command to the at least one device to cause the security system to exit the alarm state.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 2 is a schematic diagram of a base station, according to some examples described herein.

FIG. 3 is a schematic diagram of a keypad, according to some examples described herein.

DETAILED DESCRIPTION

Figure 1:
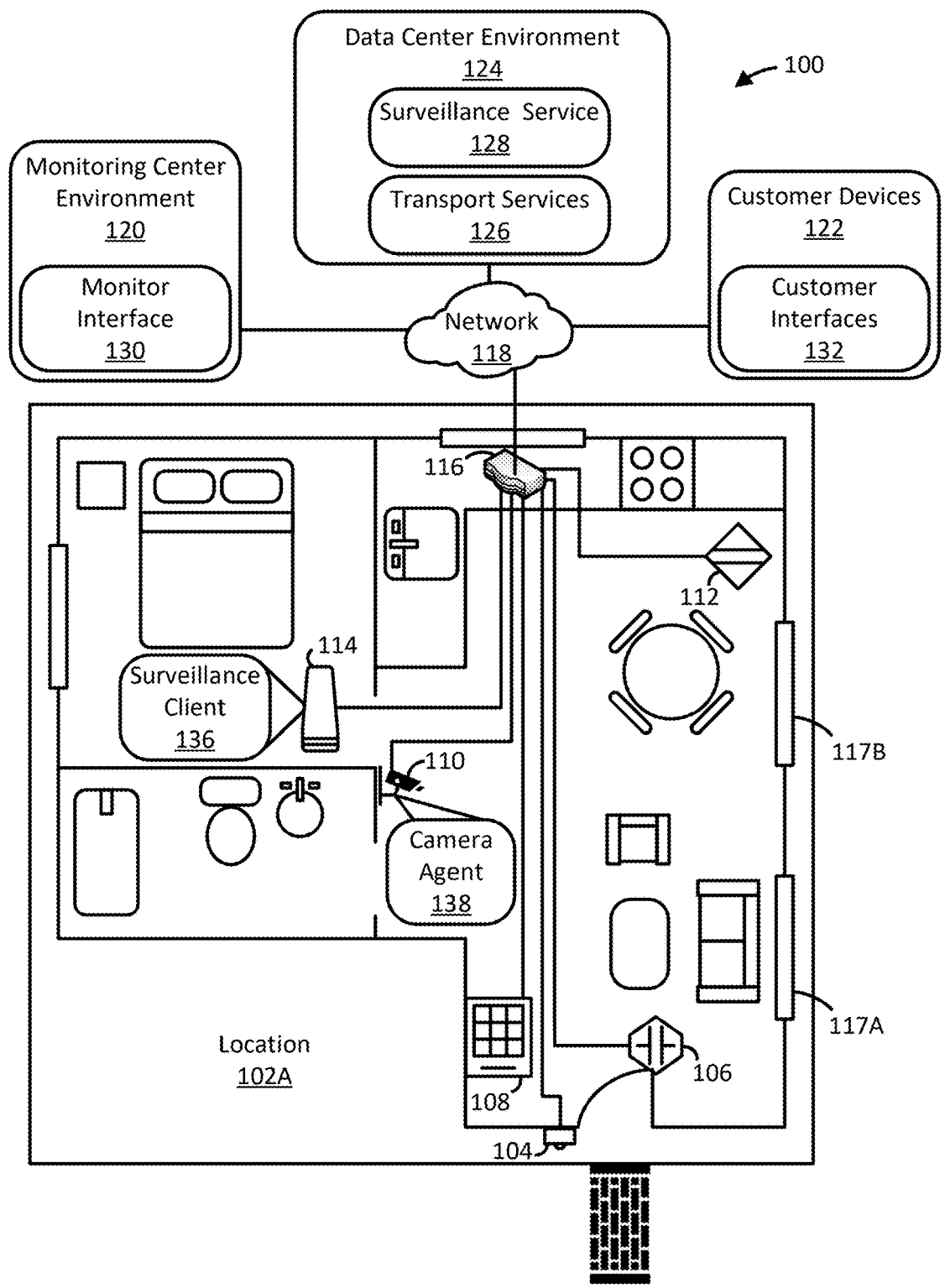
FIG. 1 is a schematic diagram of a security system, according to some examples described herein.

As summarized above, at least some examples disclosed herein relate to home security systems that are monitored by remote personnel and to techniques for providing verified, autonomous remote control of certain aspects or functionalities of the home security system.

According to certain examples, a security system may include one or more image capture devices (e.g., cameras) and/or other security sensors that are disposed at a monitored location, as described further below. Image capture devices may include a motion sensor, such as a passive infrared (PIR) sensor, as well as an image sensor assembly for acquiring video images at the monitored location. In some examples, the system is configured such that an image capture device triggers an alarm in response to detecting motion and/or certain objects of interest. Other security sensors may trigger an alarm in response to other types of events, such as a door or window being opened, or glass being broken, for example. When an alarm is triggered, the security system may enter an alarm state in which the security system may activate a siren disposed at the monitored location, cause the image capture device to record video imagery of the monitored location, contact remote personnel, and/or take other actions.

In the handling of alarms, various devices of a security system can be configured to allow communication sessions between one or more security devices located at a monitored location and a computing device located remotely from the monitored location. These sessions enable a remotely located user (e.g., a monitoring professional or a customer of a security service) to intervene at a monitored location in the event of an alarm. To intervene may include, for example, to interact with one or more security devices at the monitored location to adjust the operation of the same and/or to interact with a person at the monitored location. Such remote intervention can, in some situations, dissuade, deter, or delay theft or other types of harm. Moreover, by allowing a remotely located user to view, hear, and potentially interact with persons at the monitored location, remote interventions supported by communication sessions can help a remotely located user to determine if a dispatch to a monitored location of emergency services and/or law enforcement personnel is warranted.

In some instances, although remote monitoring personnel may interact with security devices and/or persons located at the monitored location, they may not be able to deactivate an alarm condition at the monitored location (e.g., to cause the security system to exit the alarm state, also referred to as disarming the security system). In some examples, a user can control a state of the security system (e.g., disarm the security system) from a remote location using a web-based application or dedicated application hosted on a computing device, such as a tablet or mobile phone, for example. In addition, a user located at the monitored location may be able to deactivate an alarm condition using a keypad, keyfob, or other local device at the monitored location. However, in some instances, a user may be unable to deactivate the alarm condition for some reason. For example, the user may be unable to reach the keypad or keyfob, or may not remember their PIN or password required to disarm the system due to the stress and noise experienced by a person during an alarm activation/event. In instances of a false alarm, this inability to deactivate the alarm condition may be problematic in that an activated siren can be very loud and disturbing, and/or emergency response personnel may be needlessly dispatched to the monitored location. On the other hand, safety and security concerns may make it undesirable to allow other persons, such as monitoring personnel associated with a remote monitoring service, for example, to remotely deactivate an alarm condition at a monitored location. For example, a homeowner may not feel comfortable providing a third party person (such as monitoring personnel) with autonomous control over the homeowner's security system in case that control is used, maliciously or inadvertently, to disarm the security system when it should not be disarmed (e.g., in the event of a break-in or other threat/emergency situation).

Accordingly, techniques disclosed herein provide processes for configuring a security system to automatically disarm the system in a secure manner using a verified set of conditions.

In some examples, a process for controlling a security system includes presenting, to a monitor interface, information indicating that a security system at a monitored location is in an alarm state. The information may be produced based on one or more alarm signals received from one or more security sensors at the monitored location. In some examples, the one or more alarm signals are received via a base station that is coupled to the one or more security sensors and located at the monitored location. In some examples, the method further includes receiving, from the monitor interface, a first milestone representing receipt of a valid safeword or other authenticating information from a user. The safeword or other authenticating information is obtained from the user by a monitoring professional accessing the monitor interface. The method may further include receiving, from the monitor interface, a second milestone representing receipt of a request to cause the security system to exit the alarm state. The request may be made by the user who has supplied the safeword or other authenticating information. In some examples, the method includes generating a command based on the first and second milestones, the command including instructions to cause the security system at the monitored location to exit the alarm state, and transmitting the command to the security system at the monitored location. Based on receiving the command, the security system may confidently disarm (exit the alarm state) and return the base station to a non-alarm (monitoring) state knowing that is the state desired by the user of the system.

As used herein, the term "milestone" refers to a record of a particular event, as described further below. A milestone may include, or be represented in a computing environment by, data that is stored in a machine-readable format, such as a data structure. Accordingly, the data that describes a milestone can be encoded into signals transmitted between computing devices, or components thereof, and stored on computer-readable media.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices. Any one or more of the location-based devices may include one or more computing devices (e.g., as described below with reference to FIG. 11).

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the monitored location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B & 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
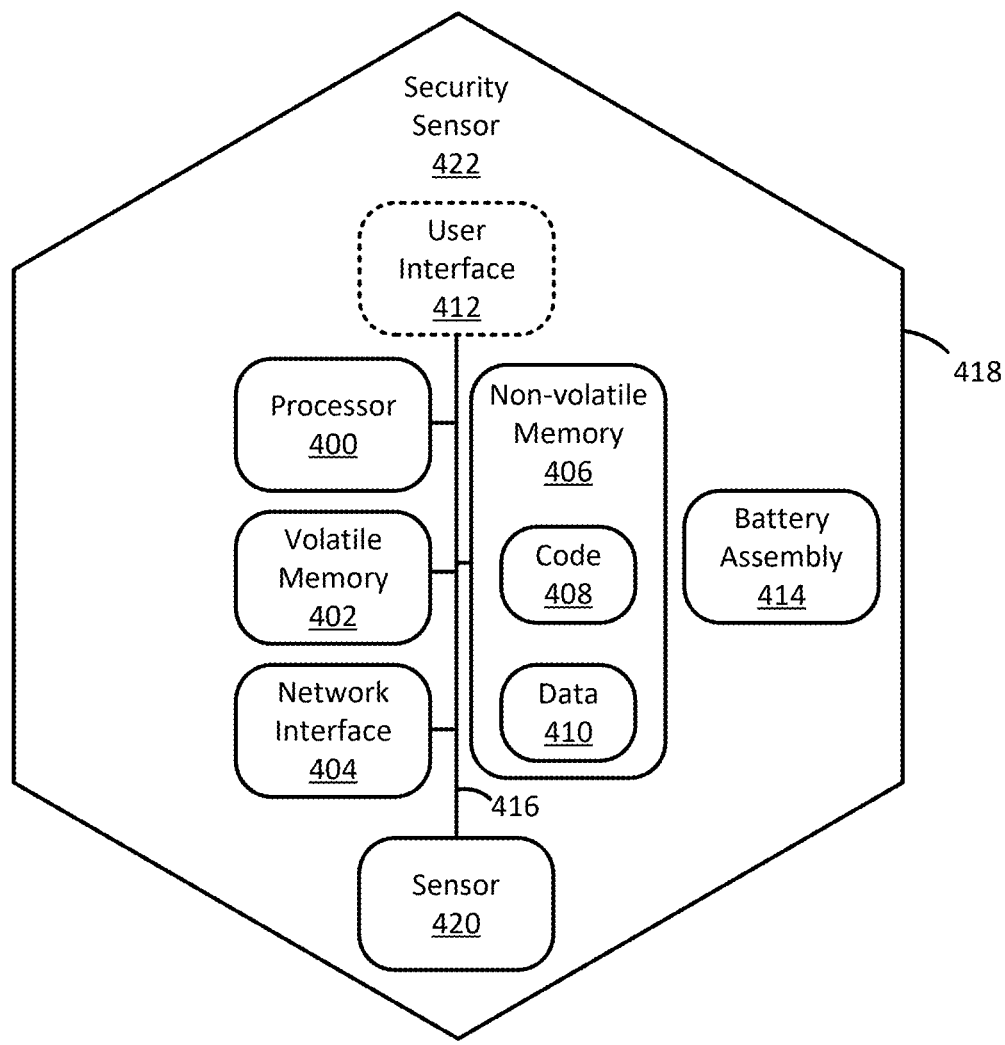
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
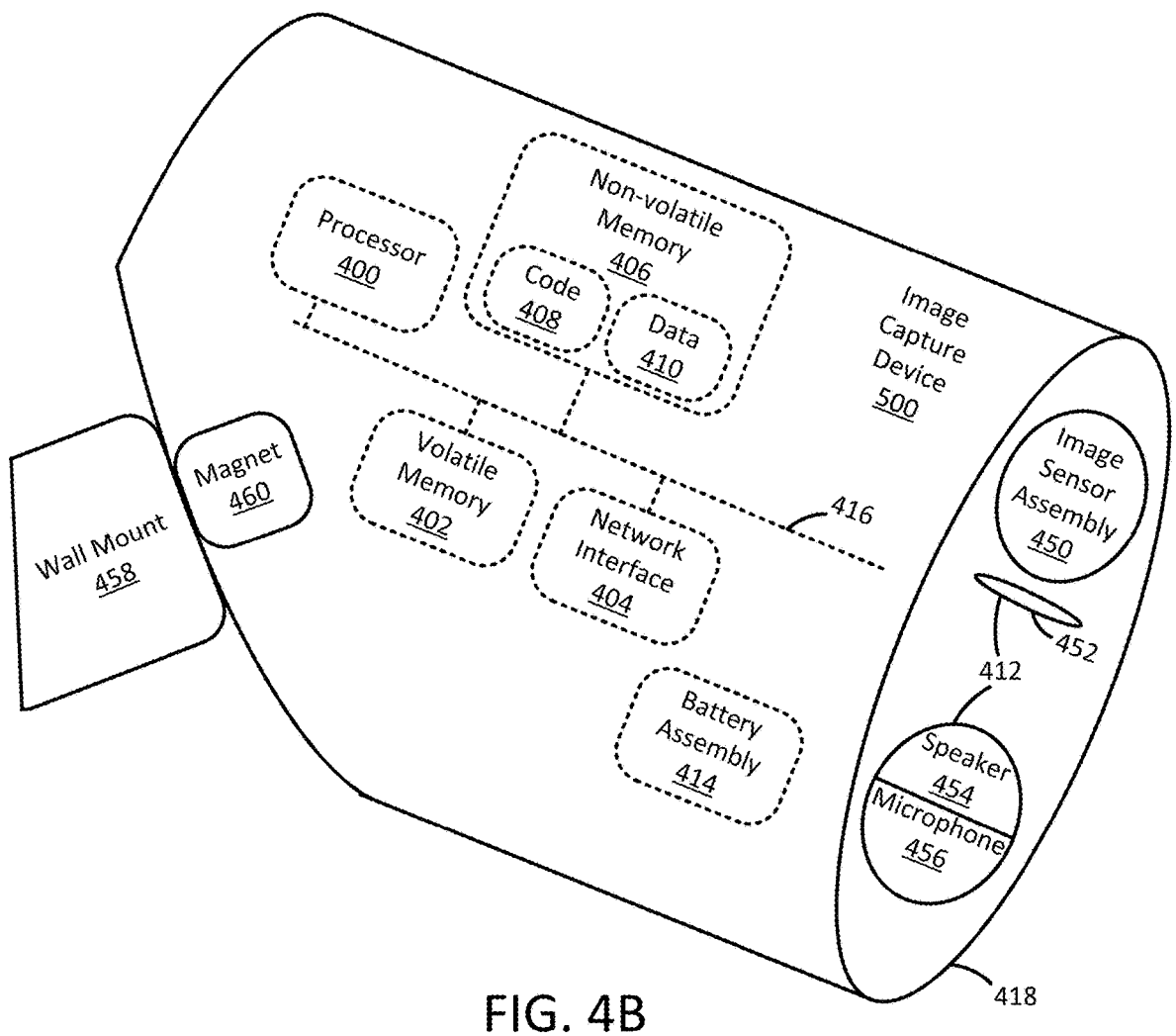
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
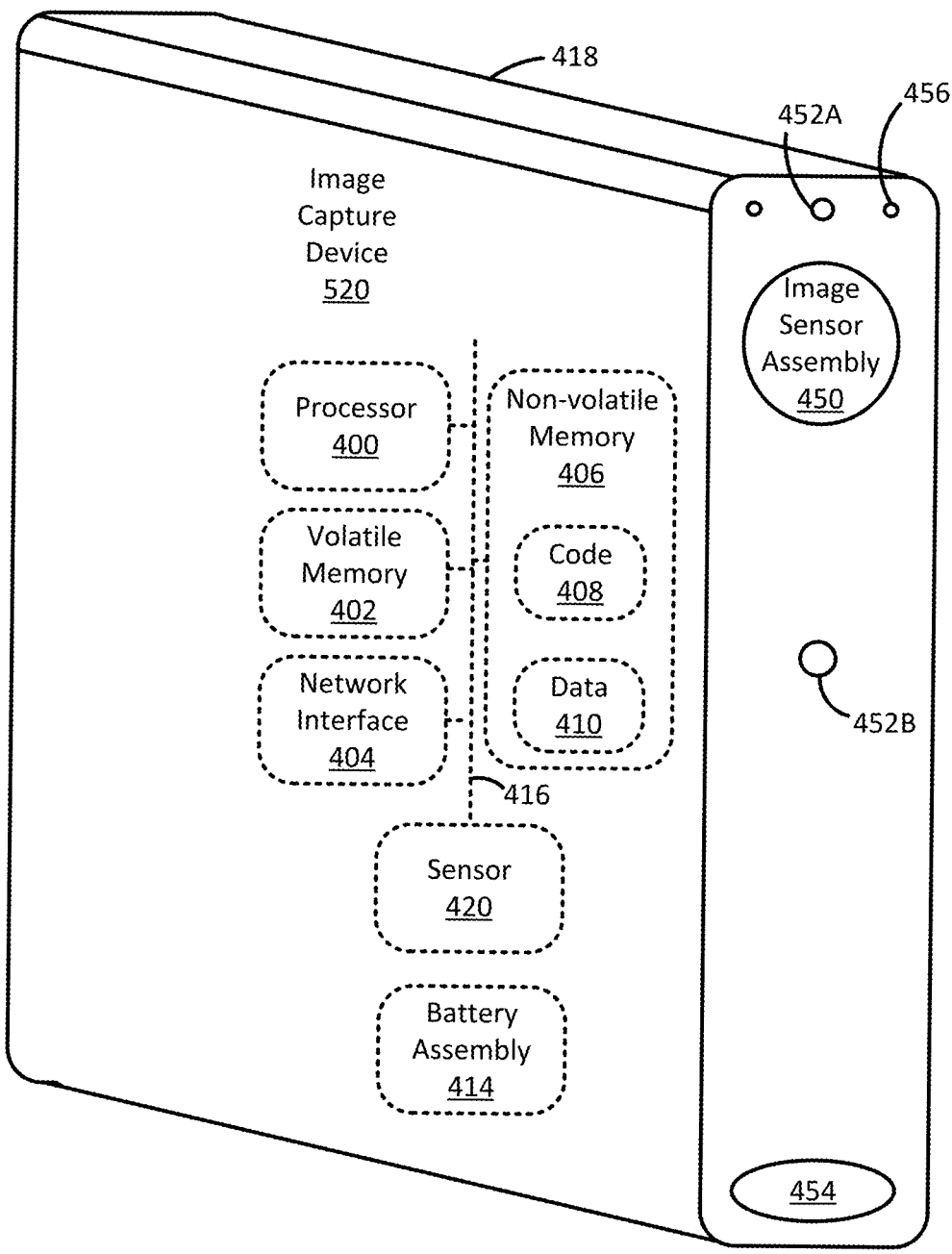
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
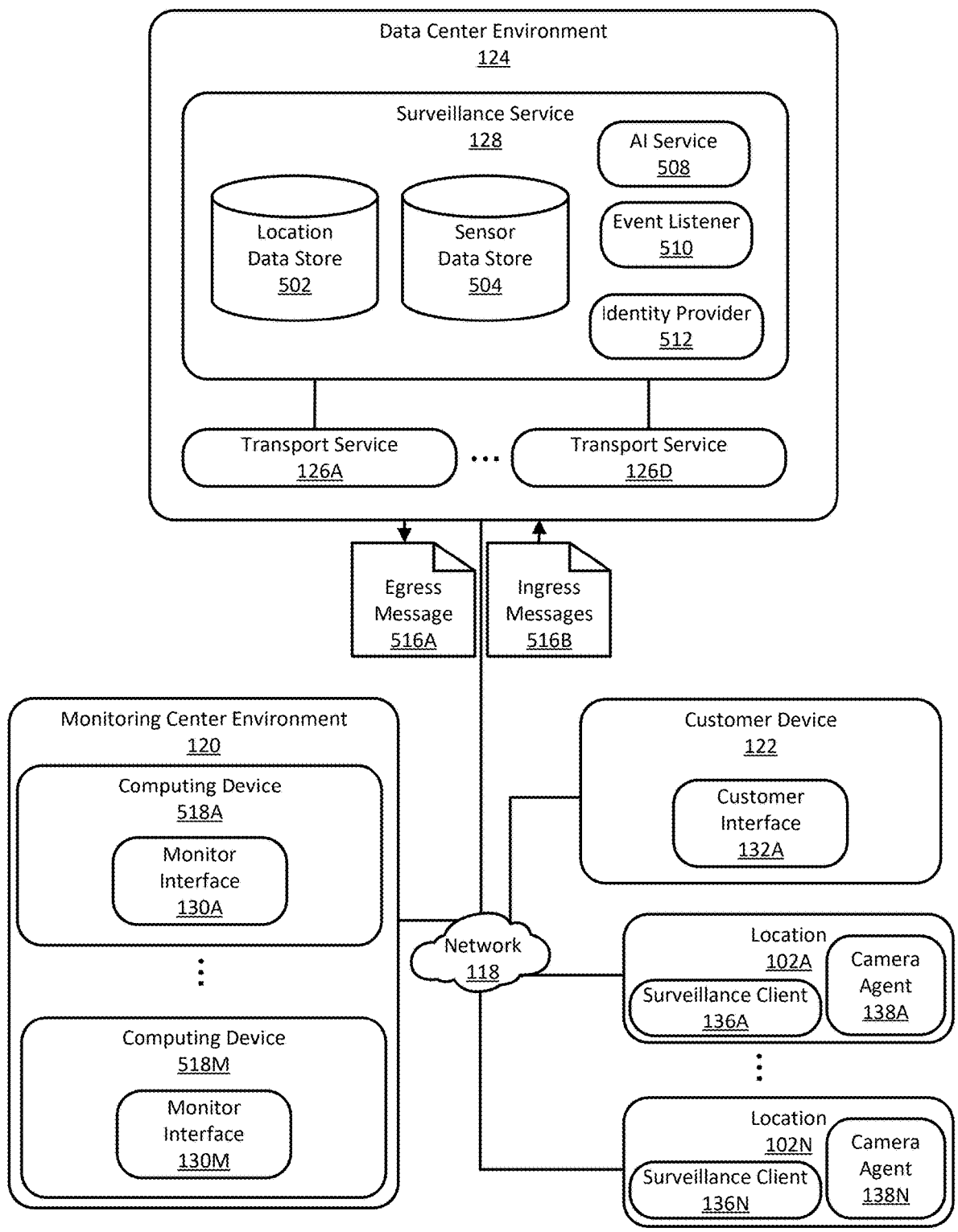
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be use, for example, where the sensor data house therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
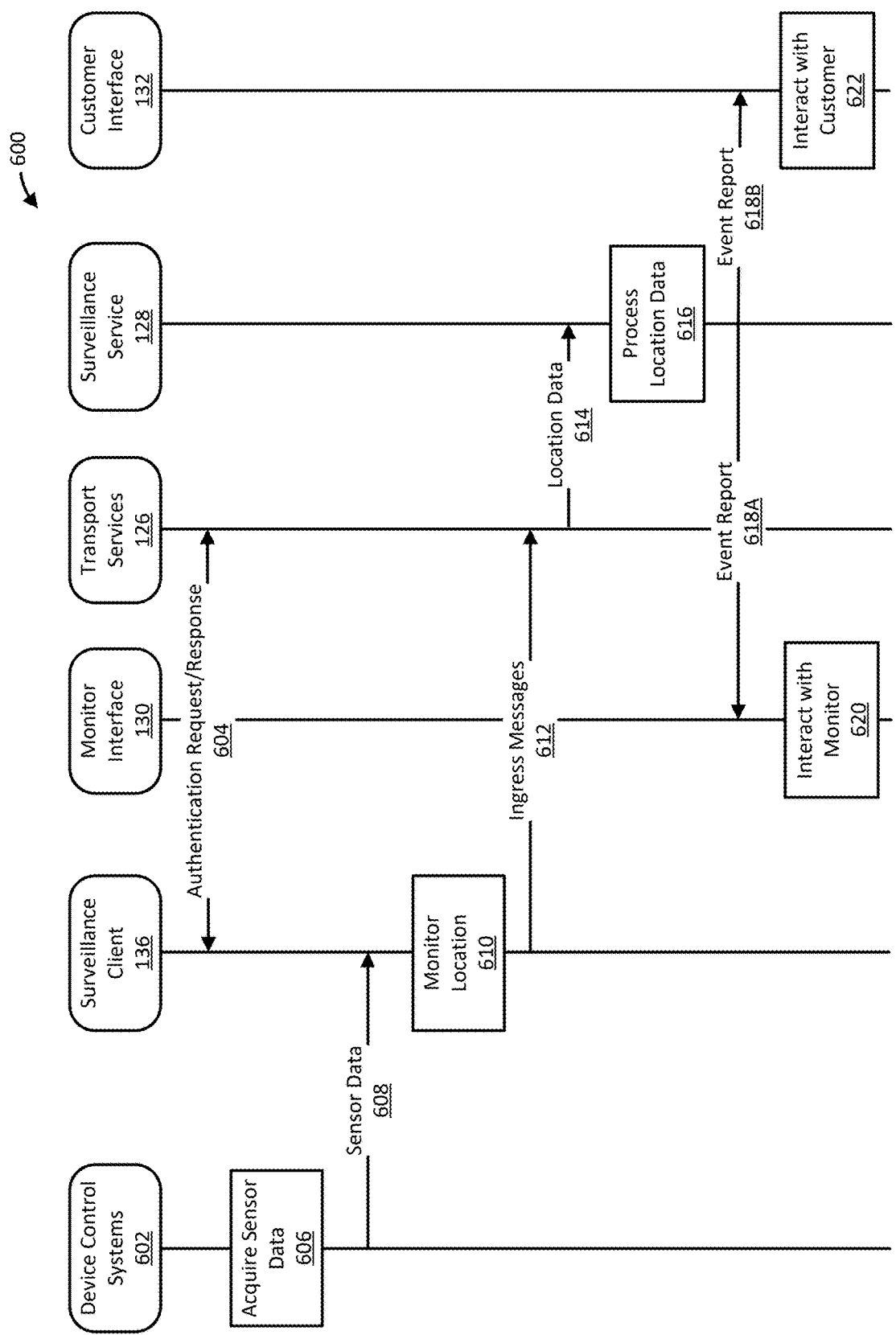
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire (at operation 606) sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more events that warrant reporting to a user. In some examples, the monitor interface 130 is configured to interact with monitoring personnel to both receive input and render output regarding alarms triggered at monitored locations, such as the location 102A. For instance, in some examples, the monitor interface 130 is configured to notify monitoring personnel of the occurrence of alarms at monitored locations, render audiovisual data and other sensor data collected by location-based devices at the monitored locations and stored in the data stores 502 and/or 504, and establish real-time connections with location-based devices. Further, in some examples, the monitor interface 130 includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Service Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be translated, by the monitor interface 130, into events that are communicated to the surveillance service 128 via a monitoring API, for example.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

As described above, when an alarm condition is triggered (e.g., by one or more security sensors 422), the security system enters an alarm state and may perform a number of response actions. For example, as described above, a siren (e.g., part of the speaker 454) may be activated and a monitoring process may be initiated in which a monitoring professional at the monitoring center environment 120 may interact with one or more devices of the security system via the monitor interfaces 130. In some examples, once the monitoring process is initiated, the monitoring professional may attempt to contact a user of the security system (e.g., the owner) to determine whether the alarm condition has been triggered by a false alarm or an actual emergency or threat. In some examples, if the monitoring professional cannot contact the user, or the user cannot supply valid verification credentials to confirm a false alarm (e.g., a "safeword," PIN, or other information that allows the monitoring professional to verify the identity of the user and/or that the user is authorized to be at the monitored location and is not an intruder), the monitoring professional will dispatch emergency services (e.g., police, fire, and/or ambulance services) to the monitored location. If the user supplies valid credentials, the monitoring professional may end the monitoring process. However, as described above, in some examples the monitoring professional is not able to control the state of the security system, and therefore, the user must still disarm the system to end the alarm condition. If the user fails to do so (e.g., because they cannot reach their keypad, they cannot remember their PIN or other access code/credentials, they cannot find their keyfob or its battery has no charge, etc.), the security system remains in the armed condition or alarm state. As a result, one or more of the security sensors 422 may continue to report alarm signals, which may cause the monitoring service to be re-initiated or cause neighbors to contact emergency services. If the user does not respond properly to the monitoring professional, this may result in emergency services being dispatched to the monitored location. As described above, dispatch of emergency services is highly undesirable in the event of false alarms. In addition, until the security system is disarmed, the siren may continue to sound, which also may be highly undesirable in the case of false alarms and to the surrounding community.

Thus, there is a need for a mechanism by which a security system can be disarmed in the case of a false alarm or resolved alarm when the user has verified their identity/authorization but is unable to disarm the system themselves. However, as described above, there are several safety and security reasons to avoid allowing "outside" entities, such as remotely-located monitoring personnel, to disarm the security system. Accordingly, aspects and embodiments provide techniques by which a security system can be configured to securely disarm (e.g., exit the alarm state and return to a normal monitoring state) based on certain verified conditions. As described further below, in determining whether the verified conditions have been met, the security system may use information obtained via the monitoring center environment 120. However, control of the state of the security system (e.g., whether or not the system is in the alarm state) may be retained within the security system. According to certain examples, rather than allowing a remote monitoring professional to disarm the system, the system autonomously exits the alarm state based on the verified conditions having been met, thus avoiding giving system control to an outside entity while also assisting users who are unable to disarm the system themselves.

Figure 7:
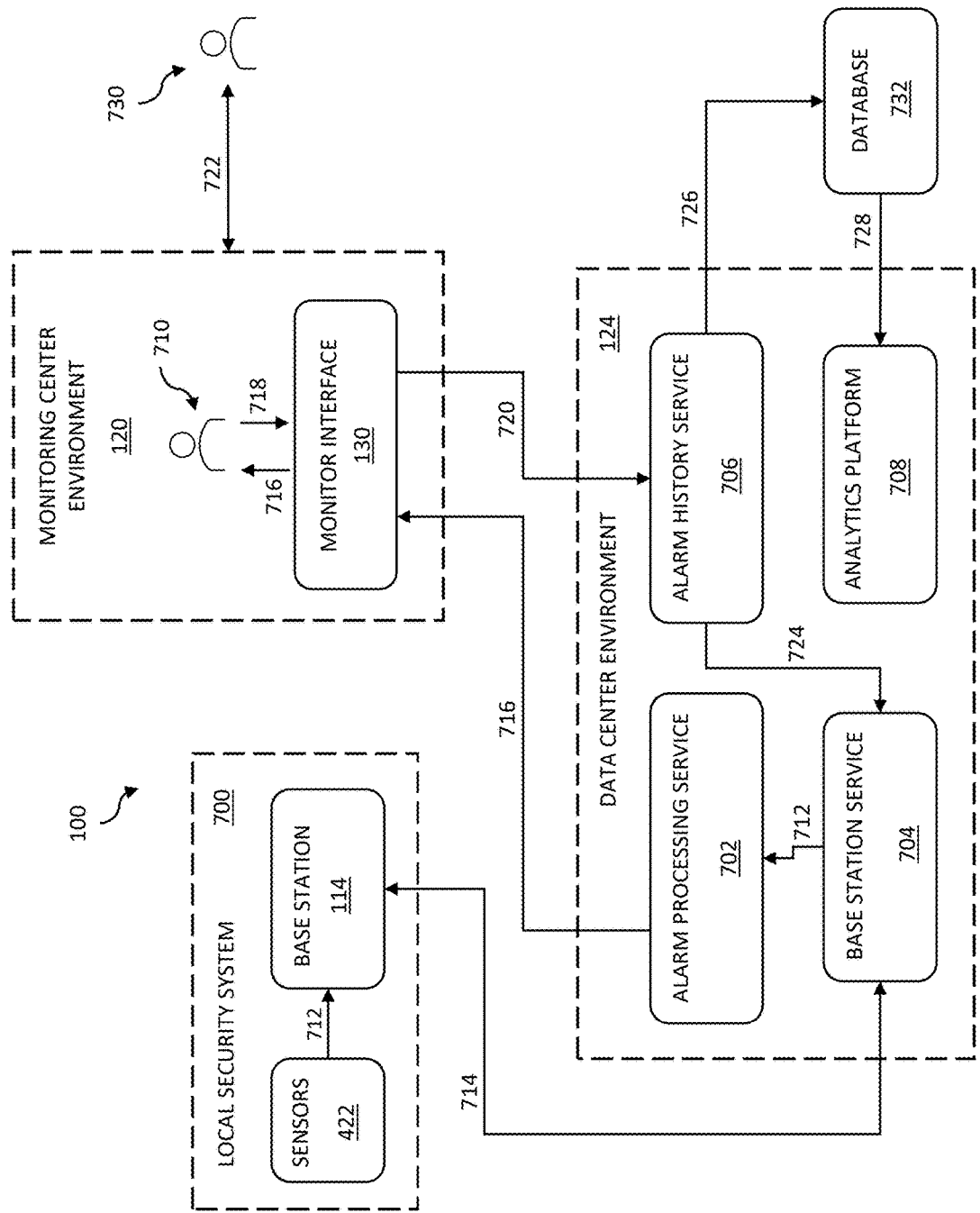
FIG. 7 is a schematic diagram of certain components of a security system according to some examples described herein.

Turning now to FIG. 7, parts of a security system (e.g., the security system 100 of FIG. 1) that is configured to implement autonomous disarming processes are schematically illustrated. These parts include an example of the data center environment 124 of FIG. 1 and a local security system 700, as may be installed at the monitored location 102A of FIG. 1, for example. In the illustrated example, the local security system 700 includes one or more security sensors 422 and the base station 114. The one or more security sensors 422 may include any one or more of a motion sensor (e.g., a PIR sensor), an imaging sensor (e.g., the image capture device 500), a door or window sensor, a glass break sensor, a panic button (which may be stand-alone device or part of a keyfob, keypad, or other device, for example), or some other sensor configured to generate an alarm signal upon detection of a certain event (such as detected motion in the example of a motion sensor). The one or more security sensors 422 are communicatively coupled to the base station 114 and may transmit alarm signals 712 to the base station 114, as described above. In some examples, the sensor(s) 422 communicate with the base station 114 using a sub-GHz wireless networking standard, as described above. The local security system 700 may additionally include various components or devices not illustrated in FIG. 7, such any one of more of any of the devices described above with reference to FIG. 1, for example.

In the example of FIG. 7, the data center environment 124 hosts an alarm processing service 702, a base station service 704, an alarm history service 706, and an analytics platform 708, any or all of which may be part of or include portions of the surveillance service 128 and/or transport services 126 discussed above. According to certain examples, the data center environment 124 is configured to provide signal processing and delivery services, as described further below, and also to capture records of particular events (referred to herein as "milestones") that are generated during the handling of an alarm condition by the security system 100. The security system 100 may use these captured milestones as part of the basis for controlling the state of the local security system 700, including whether or not to autonomously disarm the local security system 700, as described further below. Thus, in some examples, the data center environment is further configured to transmit commands to the base station 114 to control the base station 114 to exit the alarm state (thereby disarming the local security system 700) and optionally to control one or more of the security sensor(s) 422 and/or other location-based devices forming part of the local security system 700 (referred to herein as "remote actions"). For example, remote actions may include deactivating a siren and/or causing an image capture device 500 to stop recording video imagery of the monitored location 102A.

Accordingly, in some examples, the base station service 704 is communicatively coupled to the base station 114, as indicated by arrow 714 (e.g., via the network 118 as described above), and may receive the alarm signals 712 (or data corresponding to the alarm signals 712) from the base station 114. The base station service 704 may further transmit command signals to the base station 114 to drive one or more remote actions. For simplicity, the following discussion may refer to the base station service 704 receiving the alarm signals 712 from the base station 114. However, it will be appreciated that the base station 114 may package, combine, modify, or otherwise process the alarm signals 712 prior to sending them to the base station service 704 and therefore, the alarm signals 712 received by the base station service 704 may be in a different format and/or include other information relative to the alarm signals 712 provided to the base station 114 from the sensor(s) 422. The same may be true for all relayed signals described herein. Transmission of alarm signals 712 from the base station 114 to the data center environment 124 is described above with reference to FIGS. 1, 2, and 5, for example.

Continuing with the example of FIG. 7, the base station service 704 may relay the alarm signals 712 to the alarm signal processing service 702, for example, via a computing interconnection mechanism, such as the interconnection mechanism 1114 (e.g., a data bus) described below with reference to FIG. 12. The alarm signal processing service 702 may process the alarm signals 712 and transmit alarm signal information 716 to the monitor interfaces 130 (e.g., via the network 118 as described above). In some examples, the alarm history service 706 processes milestones generated during the handling of an alarm condition. At least some of the milestones processed by the alarm history service 706 are generated at the monitoring center environment 120. For example, milestones can be generated at the monitoring center environment 120 when a monitoring professional enters information into the system via the monitor interface 130. As described above, milestones include records of certain events. Accordingly, a milestone can be generated when the monitoring professional enters information of such an event (such as establishing contact with a user at the monitored location 102A, receiving authentication information from the user, receiving certain requests from the user, etc.) via the monitor interface 130. The alarm history service 706 may therefore receive alarm handling milestones 720 from the monitoring center environment 120 via the monitor interfaces 130.

For example, when a monitoring process is initiated, the monitor interface 130 may present the alarm signal information 716 (received from the alarm processing service 702) to a monitoring professional 710 for review. For example, the monitor interface 130 may include a graphical user interface that can includes text and/or imagery for viewing by the monitoring professional. Through the monitor interface 130, and one or more devices that are part of the local security system 700, the monitoring professional 710 may interact with a user 730 (e.g., an owner of the local security system 700 or other authorized person associated with the monitored location 102A), as indicated by arrow 722 and as described above. For example, the monitoring professional 710 may ask the user 730 to supply their safeword or other authentication information (e.g., a PIN, user identification number, etc., all of which are generally referred to herein as authentication information). If the user supplies correct authentication information, the monitoring professional 710 may record this event via the monitor interface 130, as indicated by arrow 718, to generate a "valid authentication" milestone that can be sent to the alarm history service 706 as part of the alarm handling milestones 720. This information may be stored in a data structure, as described above. For example, the monitoring professional may type in this information via a keyboard, select a "valid authentication information supplied" option from a drop-down menu, click a "valid authentication information supplied" checkbox, or otherwise record the information via the monitor interface 130. Thus, information/data contained in the data structure may indicate that the user has provided valid authentication information and therefore may represent the valid authentication milestone. In some examples, a flag (e.g., one or more data bits used to store binary values) can be set based on the information entered by the monitoring professional, and this flag may represent the milestone. For example, if the monitoring professional selects a "valid authentication information supplied" option from a drop-down menu or checkbox list, this selection can set a flag (e.g., binary 1 or 0) that represents a valid authentication milestone.

On the other hand, if the user 730 does not supply valid authentication information, the monitoring professional 710 may record this event via the monitor interfaces 130, as indicated by arrow 718 and described above to generate, an "invalid authentication" milestone that can be sent to the alarm history service 706 as part of the alarm handling milestones 720. For example, the invalid authentication information can be entered by the monitoring professional via a user interface and stored in a data structure as described above, and/or a flag with the opposite binary value (e.g., binary 0 or 1) can be set as described above. If the user 730 does not supply valid authentication information, the monitoring professional 710 may attempt to contact another user (e.g., the monitoring center environment may store of a list of contact persons to be contacted, optionally in a particular order, in the event of an alarm condition) and/or dispatch emergency personnel to the monitored location 102A. If the user 730 does supply valid authentication information, the monitoring professional 710 may ask the user 730 (or confirm in response to a user-initiated request) whether they want the local security system 700 to be disarmed. The user's response can be recorded (as indicated by arrow 718) to generate either a "requested disarm" milestone or a "disarm not requested" milestone, in the same manner as described above with respect to the valid/invalid authentication milestone. The "requested disarm" milestone or a "disarm not requested" milestone can then be provided to the alarm history service 706.

As described above, according to some examples, the alarm history service 706 receives the alarm handling milestones 720 from the monitoring center environment 120. Further, although not necessarily shown in FIG. 7, the alarm history service may additionally receive milestones from other components of the security system 100. For example, the alarm history service may receive and an "alarm mode" milestone that may be generated by the base station 114, base station service 704, or alarm processing service 702 in response to an alarm signal 716 from one or more of the security sensor(s) 422. Furthermore, the alarm history service 706 may acquire other milestones and/or event information throughout an alarm handling procedure. For example, this event information may include records of events, such as an alarm being triggered, the monitoring center environment being contacted, and/or other actions being taken by any of the local security system 700, the data center environment 124, and/or the monitoring center environment 120. Individual events, including milestones, may be time-stamped, indicating a time at which the event occurred. Thus, the alarm history service 706 may accumulate a sequence of events corresponding to a given alarm condition. In some examples, the alarm history service 706 integrates the alarm handling milestones 720 acquired from the monitoring center environment into this sequence of events, and leverages them to validate that the user 730, when contacted by the monitoring professional 710, has properly authenticated themselves (based on acquiring the valid authentication milestone) and has requested that the local security system 700 be disarmed (based on the requested disarm milestone).

Based on acquiring the appropriate milestones, and determining that these milestones have been generated at expected times/points in the sequence of events corresponding to the given alarm condition, the alarm history service 706 may generate one or more remote action commands 724. As described above, in some examples, records of events, including the milestones, are time-stamped. Accordingly, the alarm history service 706 may process the milestones in the context of the complete sequence of events to determine, based on the time-stamps, whether the milestones have been generated at expected/appropriate times. For example, a "requested disarm" milestone should not be received before (e.g., should not have an earlier timestamp than) a "valid authentication" milestone. Similarly, neither milestone should occur before initiation of an alarm. Thus, by comparing the records of events and corresponding time-stamps, the alarm history service 706 can determine whether or not a remote action command should be generated. Furthermore, in some examples, once an alarm is triggered, recorded events and/or milestones may be tagged with an identifier (e.g., one or more bits in a data structure representing the event record or milestone) that associates the record with a particular alarm condition. Thus, a sequence of events can be produced for individual alarm conditions, with individual events and/or milestones time-stamped and tagged to produce a coherent, organized record for the respective alarm condition.

The alarm history service may generate the remote action command 724 as an instruction (e.g., a digital signal comprising encoded data), and provide these remote action command(s) 724 to the base station service 704 for relaying to the base station 114. In some examples, the remote action command(s) 724 include a command to disarm the local security system 700. As described above, the alarm history service 706 may maintain a record of a given alarm incident. As individual milestones can be time-stamped and tagged for a given alarm incident, based on this information, the alarm history service can determine which alarm incidents have had valid authentication supplied by the user 730 (the record includes a valid authentication milestone) and which have not (the record does not include a valid authentication milestone). When receiving the "disarm requested" milestone from the monitoring center environment 120, the alarm history service 706 may confirm whether or not the valid authentication milestone is present in the record, and confirm whether or not the local security system 700 is in the alarm state. If the local security system is in the alarm state (e.g., has not already been disarmed by the user 730) and valid authentication has been received, the alarm history service 706 may send a remote disarm command (as one of the remote action commands 724) to the base station 114 via the base station service 704, as described above. Thus, according to certain examples, the security system 100, through the data center environment 124, uses information obtained via the monitoring professional 710, along with internally obtained information (such as the current alarm state and/or the alarm signals 716), to execute remote disarming of the local security system 700. In this manner, the local security system 700 can be safely disarmed when the user's 730 intent and authorization have been validated and without providing direct or independent remote disarming capability to the monitoring professional 710.

Still referring to FIG. 7, in addition to generating the remote action commands 724, the alarm history service 706 may transmit information 726 regarding the remote action commands 724, alarm handling milestones 720, and/or other events or action associated with a given alarm incident, to a database 732 for storage. The database 732 may be external to the data center environment 124 (as illustrated in FIG. 7) or may be part of the data center environment 124. In some examples, stored event information in the database 732 can be used to generate an audit event that links actions taken by the monitoring professional 710 with actions of the user 730 and system actions (e.g., remote action commands 724) for long-term auditing purposes. For example, the audit event can be based on the milestones received and processed by the alarm history service 706 along with the remote action commands 724. Thus, an audit event can be used to validate whether or not a given remote action command 724 was based on appropriate milestones and system state conditions. For example, an audit event can be used to validate that a remote disarm command was issued only after receipt of both a valid authentication milestone and a requested disarm milestone. In certain examples, the analytics platform 708 may receive audit event information 728 from the database 732. The analytics platform 708 and/or the database 732 can store audit events and/or associated information for later analysis by a person or computing system.

As described above, in some examples, the monitoring professional 710 interacts with (e.g., communicates with, speaks to, and/or listens to) the user 730 as part of an alarm handling routine. This interaction may occur over a telephone line or network connection between the monitor interfaces 130 and a device that can be accessed by the user 730. As described above, in some examples, the image capture device 500 includes a speaker 454, a microphone 456, and a network interface 404. Through the use of these components, the image capture device 500 can be used to provide two-way communication between the user 730 (when the user 730 is located at the monitored location 102A) and the monitoring professional 710. For example, the image capture device 500 may include a communications client (e.g., a web real-time communication (WebRTC) client) that allows the image capture device to establish a real-time communication session with external devices (e.g., the monitor interfaces 130). A real-time communication session may refer to any mode of telecommunications in which participants can exchange information instantly or with negligible latency or transmission delays. In this context, the term real-time is synonymous with live.

Figure 8:
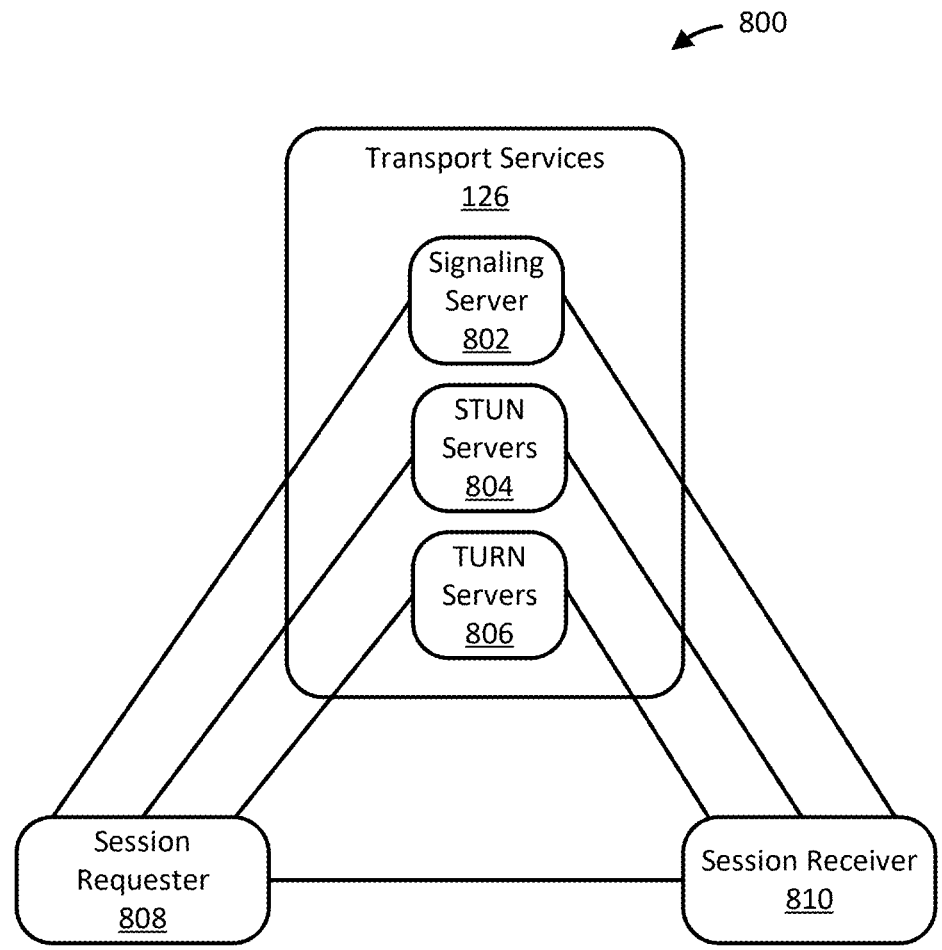
FIG. 8 is a schematic diagram of processes involved in establishing and conducting real-time communication sessions, according to some examples disclosed herein.

Turning now to FIG. 8, a set of processes 800 involved in establishing and conducting a communication session (e.g., a real-time communication session) via a WebRTC client hosted by the image capture device 500 (or another device that is part of the local security system 700) is illustrated as a schematic diagram. As shown in FIG. 8, the set of processes 800 includes the transport services 126, which are described above with reference to FIGS. 1 and 5. As is further shown in FIG. 8, the transport services 126 include a signaling server 802, one or more Session Traversal Utilities for Network Address Translators (STUN) servers 804, and one or more Traversal Using Relays around Network Address Translators (TURN) servers 806. The set of processes 800 further includes a session requester 808 and a session receiver 810. In the example of FIG. 8, the requester 808 is the monitor interface 130A described above with reference to FIGS. 1 and 5 (which is accessed by the monitoring professional 710), and the receiver 810 is implemented in a device that is part of the local security system 700 (e.g., one of the security sensors 422, such as the image capture device 500).

In some examples, during interaction between the monitoring professional 710 and the user 730, the requester 808 is configured to communicate with the receiver 810 via the signaling server 802 to establish a real-time communication session via, for example, a WebRTC framework. The signaling server 802 is configured to act as an intermediary or broker between the requester 808 and the receiver 810 while a communication session is established. As such, in some examples, an address (e.g., an IP address and port) of the signaling server 802 is accessible to both the requester 808 and the receiver 810. For instance, the IP address and port number of the signaling server 802 may be stored as configuration data in memory local to the devices hosting the requester 808 and the receiver 810. In some examples, the receiver 810 is configured to retrieve the address of the signaling server 802 and to register with the signaling server 802 during initialization to notify the signaling server of its availability for real-time communication sessions. In these examples, the requester 808 is configured to retrieve the address of the signaling server 802 and to connect with the signaling server 802 to initiate communication with the receiver 810 as part of establishing a communication session with the receiver 810. In this way, the signaling server 802 provides a central point of contact for a host of requesters including the requester 808 and a central point of administration of a host of receivers including the receiver 810.

Continuing with the example of FIG. 8, the STUN servers 804 receive, process, and respond to requests from other devices seeking their own public IP addresses. In some examples, individual requesters 808 and the receiver 810 are configured to interoperate with the STUN servers 804 to determine the public IP address of its host device. The TURN servers 806 receive, process, and forward WebRTC messages from one device to another. In some examples, individual requesters 808 and the receiver 810 are configured to interoperate with the TURN servers 806, if a WebRTC session that utilizes the public IP addresses of the host devices cannot be established (e.g., a network translation device, such as a firewall, is interposed between the host devices).

In some examples, a requester 808 exchanges interactive connectivity establishment (ICE) messages with the STUN servers 804 and/or the TURN servers 806. Via this exchange of the messages, the requester 808 generates one or more ICE candidates and includes the one or more ICE candidates within a message specifying an SDP offer. Next, the requester 808 transmits the message to the signaling server 802, and the signaling server 802 transmits the message to the receiver 810. The receiver 810 exchanges ICE messages with the STUN servers 804 and/or the TURN servers 806, generates one or more ICE candidates and includes the one or more ICE candidates within a response specifying an SDP answer. Next, the receiver 810 transmits the response to the signaling server 802, and the signaling server 802 transmits the response to the requester 808. Via the messages, the requester 808 and the receiver 810 negotiate communication parameters for a real-time communication session and open the real-time communication session.

In some examples, while participating in the real-time communication session, the receiver 810 (e.g., the image capture device 500) collects audio-visual sensor data (e.g., through the image sensor assembly 450 and microphone 456) and transmits the audio-visual sensor data to the requester 808. Further, in these examples, while participating in the real-time communication session, the receiver 810 outputs audio (e.g., via the speaker 454) received from the requester 808. In a similar fashion, while participating in the real-time communication session, the requester 808 renders (e.g., via a display and speaker in the monitoring center environment 120) the audio-visual sensor data collected by the receiver 810. Further, while participating in the real-time communication session, the requester 808 collects audio data (e.g., through a microphone of the monitoring center environment 120) and transmits the audio data to the receiver 810. In this way, the monitoring professional 710 can interact with the user 730 at the monitored location 102A in real-time to help dispose of the alarm.

Figure 9:
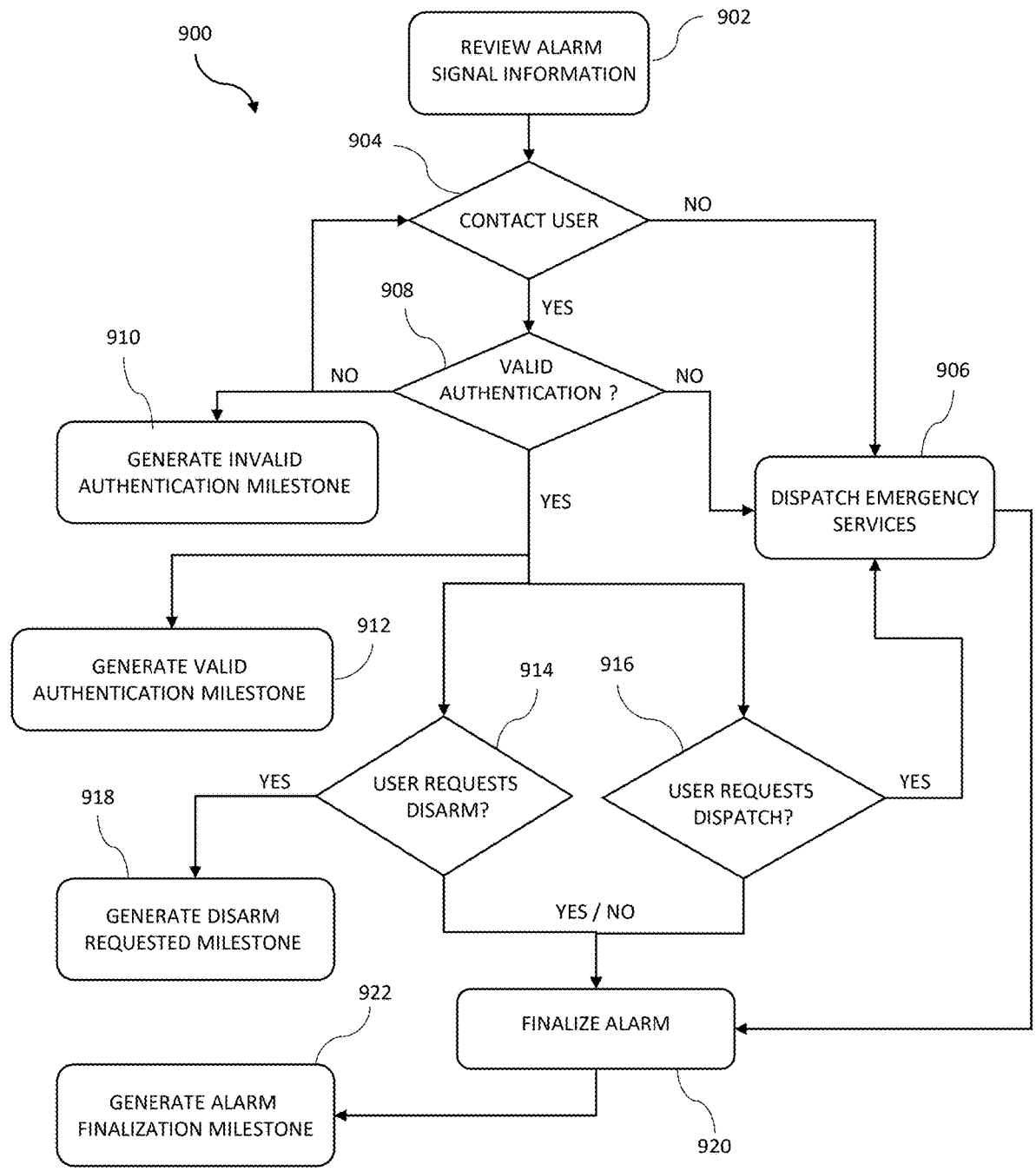
FIG. 9 is a flow diagram of an alarm handling process, according to some examples disclosed herein.
Figure 10:
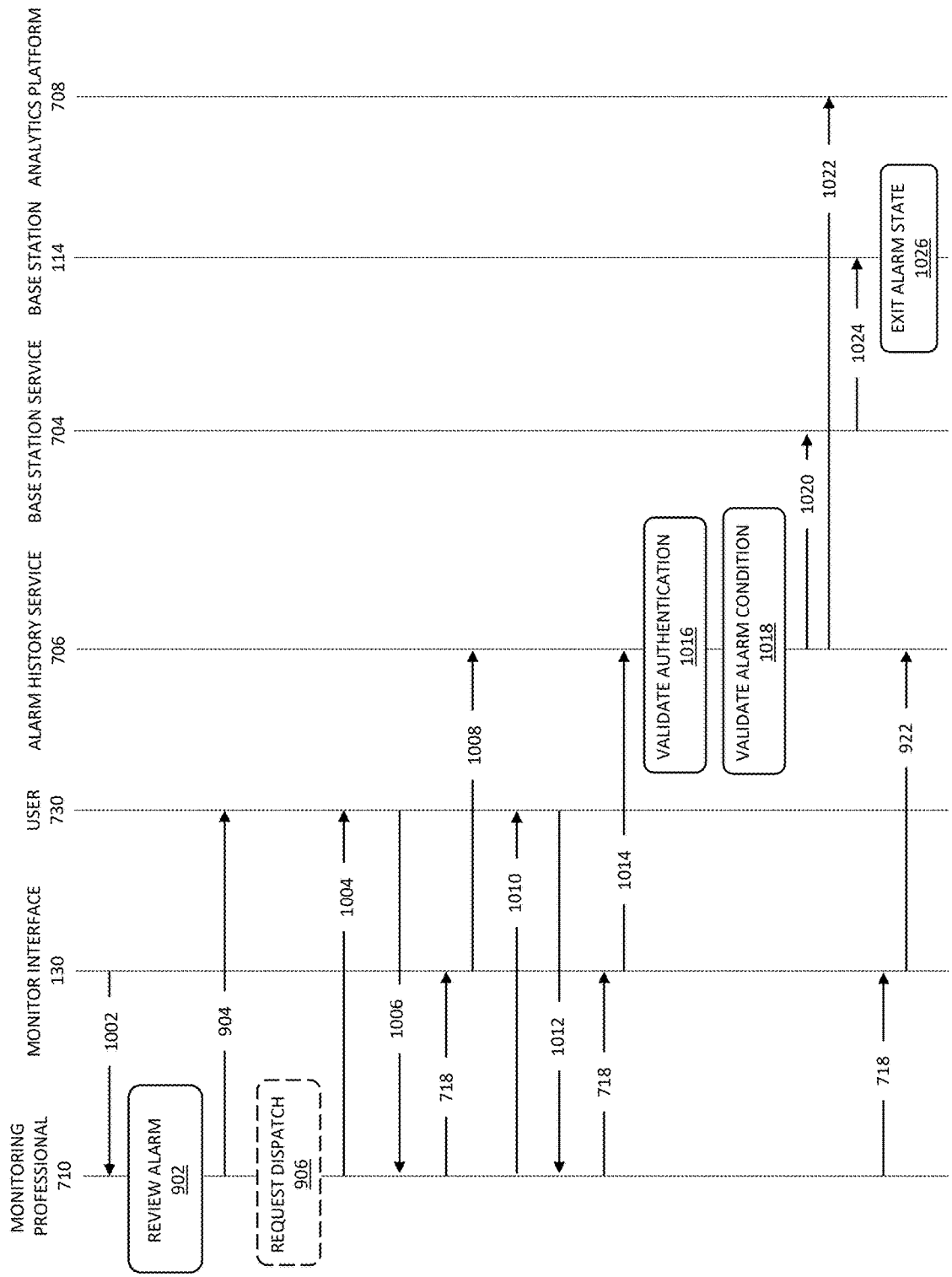
FIG. 10 is a sequence diagram of an alarm handling process, according to some examples disclosed herein.

Turning now to FIGS. 9 and 10, there are illustrated examples of an alarm handling process 900 that includes provisions for allowing the data center environment 124 to disarm the local security system 700 based on certain validated conditions (e.g., receipt of a valid authentication milestone and a disarm requested milestone), as described above. FIG. 9 is a flow diagram illustrating an example of the process 900, and FIG. 10 provides an example of a corresponding sequence diagram. The process 900 may be implemented in response to an alarm being triggered by one or more of the security sensors 422.

In one example, at operation 1002, the monitor interface 130 presents alarm signal information to the monitoring professional 710 for review. As described above, the alarm signal information may represent, correspond to, or be based on, the alarm signals 716 relayed to the monitor interface 130 via the base station 114, base station service 704, and alarm processing service 702.

At operation 902, the monitoring professional 710 may review the alarm signal information and proceed through an alarm handling routine. The alarm handling routine can include various actions taken by the monitoring professional 710 and various interactions between the monitoring professional 710 and one or more devices that are part of the local security system 700, as described above. In some examples, the alarm handling routine includes contacting one or more designated contact persons, such as the user 730. Accordingly, at operation 904, the monitoring professional 710 may attempt to contact the user 730. If the monitoring professional cannot contact the user 730, the monitoring professional 710 may request dispatch of emergency services to the monitored location 102A (operation 906). In some instances, operation 904 may include attempting to contact two or more designated contact persons, optionally in a specified order. In such instances, the monitoring professional 710 may request dispatch of emergency services to the monitored location 102A (operation 906) if none of the designated contact persons can be reached within a specified time frame. As described above, contacting the user 730 at operation 904 may include establishing communication with the user 730 through any of various communication channels, such as a telephone line, network connection, or real-time communication session via a device that is part of the local security system 700.

At operation 1004, if the monitoring professional 710 contacts the user 730 (who may be any of the designated contact persons, not necessarily only the first designated contact person on a list), the monitoring professional 710 may request that the user 730 provide their safeword or other identifying information for the monitoring professional to authenticate the user 730. Accordingly, at operation 1006, the user 730 responds to the request from the monitoring professional 710.

At operation 908, the monitoring professional 710 verifies whether or not the user 730 has provided a valid safeword. As described above, the monitoring professional 710 may record information 718 via the monitor interface 130 indicating whether or not the user 730 provided valid authentication (e.g., a valid safeword or other identifying information). If the user 730 does not supply valid authentication, the monitor interface 130 may generate an invalid authentication milestone 720 (operation 910) and, at operation 1008, forward the invalid authentication milestone to the alarm history service 706 (e.g., as a digital signal communicated over the interconnection mechanism 1114, as described above). Furthermore, the monitoring professional 710 may attempt to contact another user on the designated contacts list (e.g., repeat operation 904). In some examples, the monitoring professional 710 requests dispatch of emergency services to the monitored location 102A (operation 906), either directly after the user 730 cannot supply a valid safeword or after additional users either cannot be contacted or cannot supply valid authentication. If the user 730 does supply valid authentication, the monitor interface 130 may generate a valid authentication milestone 720 (operation 912) and, at operation 1008, forward the valid authentication milestone to the alarm history service 706.

Continuing with the examples of FIGS. 9 and 10, if the user 730 does supply a valid safeword or other identifying information, at operations 1010 and 1012, the monitoring professional 710 may further interact with the user 730. In some examples, the monitoring professional determines whether or not the user 730 wants the local security system 700 to be disarmed (operation 914). In some examples, at operation 1010, the monitoring professional 710 asks the user 730 if they would like the local security system 700 to be disarmed. In other examples, at operation 1012, the user 730 independently requests the monitoring professional 710 to assist them with disarming the local security system 700. In either scenario, if at operation 1012 the user requests or confirms that they want the local security system 700 to be disarmed, the monitoring professional 710 records information 718 via the monitor interface 130 (e.g., by typing in the information using a keyboard or other user interface mechanism, clicking or otherwise selecting from a drop-down menu or checkbox list, or otherwise entering the information via a graphical user interface) indicating that the user has requested disarming of the local security system 700. Accordingly, at operation 918, the monitor interface 130 may generate a disarm requested milestone 720, and at operation 1014, forward the disarm requested milestone 720 to the alarm history service 706, as described above.

In some examples, at operation 916, during interactions with the user 730 at operations 1010 and 1012, the monitoring professional 710 may determine whether or not the user 730 needs the monitoring professional 710 to dispatch emergency services to the monitored location 102A. If the user requests dispatch of emergency services, or if the monitoring professional 710 determines that emergency services are required, the monitoring professional 710 may request dispatch of emergency services at operation 906, as described above with reference to FIGS. 6 and 7.

Referring to FIG. 10, in some examples, when the alarm history service 706 receives the disarm requested milestone 720, the alarm history service may perform various validation actions prior to generating a remote action command 724. For example, at operation 1016, the alarm history service 706 may validate that the valid authentication milestone 720 has been received. Further, at operation 1018, the alarm history service 706 may validate that the local security system 700 is in the alarm state. For example, as described above, when an alarm is triggered via one or more of the security sensor(s) 422 and a corresponding alarm signal 716 is produced, an alarm milestone is generated (e.g., as a flag or other digital signal) and provided to the alarm history service 706 (e.g., via the interconnection mechanism 1114), as described above. Similarly, in some examples, when the local security system is disarmed (e.g., exits the alarm state at operation 1026), an "alarm condition ended" milestone is generated and provided to the alarm history service. Accordingly, at operation 1018, the alarm history service 706 may validate that an alarm milestone has been received (e.g., by confirming that the event record includes a tagged alarm milestone, as described above) and that an alarm condition ended milestone has not been received (e.g., the event record does not include a tagged alarm condition ended milestone). Based on this validated set of conditions (e.g., valid authentication milestone received, disarm requested milestone received, and the local security system 700 being in the alarm state), the alarm history service 706, at operation 1020, generates a remote action 724 command (e.g., as a digital signal, as described above) instructing the base station 114 to disarm the local security system 700 ("remote disarm command") and forwards the remote action command to the base station service 704 (e.g., via the interconnection mechanism 1114).

At operation 1024, the base station service 704 relays the remote disarm command to the base station 114.

At operation 1026, the base station 114 processes the remote disarm command and causes the local security system 700 to exit the alarm state. In some examples, exiting the alarm state includes deactivating the siren and/or returning the base station to anon-alarm condition. In some examples, disarming the local security system 700 includes turning off some or all of the sensors, such that the sensor(s) are no longer monitoring for alarm conditions. In other examples, disarming the local security system 700 includes causing modifying operation of one or more sensors (e.g., causing an image capture device to stop recording video imagery), while maintaining the sensor(s) in a monitoring state to monitor for new alarm triggers.

In some examples, at operation 1022, the alarm history service 706 transmits information 726 to the database 732 for storage. As described above, the information 726 may include records of the remote action command(s) 724 generated optionally along with records of some or all of the milestones received. For example, the information 716 may include at least a record of the milestones used in generation of the remote action command(s) 724. As described above, recording the information 726 in the database 732 allows the analytics platform 708 to perform an audit to validate that an appropriate remote action command was issued based on the sequence of events corresponding to a given alarm incident and the associated milestones that were generated and received by the alarm history service 706.

Continuing with the examples of FIGS. 9 and 10, when the monitoring professional concludes the alarm handling routine, the monitoring professional 710 may finalize the alarm (e.g., close or terminate an alarm event handling session via their user interface) at operation 920. For example, the monitoring professional 710 may record information 718 via the monitor interface 130 confirming that the alarm condition has been resolved. For example, this information may include data indicating the manner in which the alarm has been resolved (e.g., emergency services dispatched, user disarmed the system, remote disarm was requested, etc.). In some examples, at operation 922, the monitor interface 130 generate an alarm condition ended milestone, which is forward to the alarm history service 706, as described above.

Thus, aspects and examples provide techniques by which a security system can implement an autonomous remote disarm based on a set of verified conditions. By using milestones that are generated during the handling of an alarm incident, the system can ensure that a proper sequence of events has occurred before exiting the alarm state. For example, confirming that a valid authentication milestone has been received prior to issuing a remote disarm command reduces the risk of a disarm command being sent without an authorized user verifying themselves first. Examples disclosed herein address the need to assist authorized, authenticated users who cannot disarm the security system themselves while maintaining control of the state the security system (e.g., disarm capability is not given to outside persons, such as the monitoring professional 710) and reducing the risk of an unauthorized disarm event.

Figure 11:
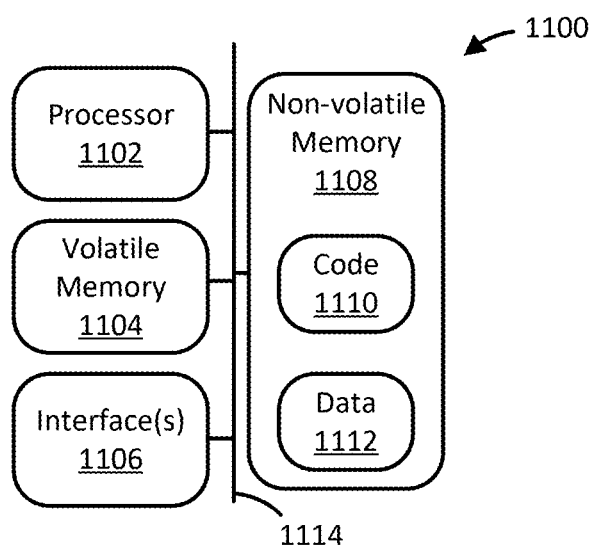
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, non-volatile memory 1108, and an interconnection mechanism 1114. The non-volatile memory 1108 includes code 1110 and at least one data store 1112.

In some examples, the non-volatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the non-volatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the non-volatile memory 1108 to the volatile memory 1104. In some examples, the volatile memory 1104 includes one or more static or dynamic random access memory (RAM) chips and/or cache memory (e.g. memory disposed on a silicon die of the processor 1102). Volatile memory 1104 can offer a faster response time than a main memory, such as the non-volatile memory 1108.

Through execution of the code 1110, the processor 1102 can control operation of the interfaces 1106. The interfaces 1106 can include network interfaces. These network interfaces can include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various features of the computing device 1100 described above can communicate with one another via the interconnection mechanism 1114. In some examples, the interconnection mechanism 1114 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising receiving, by a computing device, a plurality of milestones indicating events in a security system while the security system is in an alarm state at a location remote from the computing device, the plurality of milestones including first and second milestones indicative of (i) validity of authentication information, and (ii) a request for the security system to exit the alarm state, respectively, generating, by the computing device, a command in response to receipt of the first and second milestones, the command including instructions to cause the security system to exit the alarm state upon receipt of the command by at least one device of the security system, and transmitting, by the computing device, the command to the at least one device to cause the security system to exit the alarm state.

Example 2 includes the method of Example 1, further comprising receiving, by the computing device, at least one alarm signal from the at least one device indicating that the security system is in the alarm state, and generating, in response to receipt of the at least one alarm signal, a third milestone indicating that the security system is in the alarm state.

Example 3 includes the method of Example, 2, further comprising prior to generating the command, validating, by the computing device and based on the third milestone, that the security system is in the alarm state.

Example 4 includes the method of any one of Examples 1-3, further comprising transmitting, by the computing device, a signal to a monitor interface remote from the computing device and from the location, the signal indicating that the security system is in the alarm state, wherein receiving the plurality of milestones includes receiving, by the computing device, the first and second milestones from the monitor interface.

Example 5 includes the method of any one of Examples 1-4, wherein transmitting the command to the at least one device includes transmitting the command to a base station over a wireless network connection.

Example 6 includes the method of any one of Examples 1-5, further comprising storing data corresponding to the first and second milestones in a database.

Example 7 includes the method of Example 6, further comprising generating an audit event based on the first and second milestones and the command, wherein the audit event links the command to the first and second milestones.

Example 8 provides security system comprising a plurality of devices disposed at a location, the plurality of devices including a base station and at least one sensor coupled to the base station and configured to produce an alarm signal indicating that the security system is in an alarm state, and a computing system remote from the location and hosting an alarm history service, wherein the alarm history service is configured to receive a plurality of milestones including a first milestone, a second milestone, the first milestone indicative of validity of authentication information, and the second milestone indicative of a request for the security system to exit the alarm state, the alarm history service further configured to generate a command in response to receipt of the first and second milestones, the command including instructions to cause the security system to exit the alarm state upon receipt of the command by the base station.

Example 9 includes the security system of Example 8, wherein the computing system further hosts a base station service configured to relay the command from the alarm history service to the base station via a wireless network connection.

Example 10 includes the security system of one of Examples 8 or 9, wherein the computing system further hosts an alarm processing service configured to generate an alarm milestone in response to receiving the alarm signal, the alarm milestone indicating that the security system is the alarm state.

Example 11 includes the security system of Example 10, wherein the alarm history service is configured to, prior to generating the command, validate based on the alarm milestone, that the security system is in the alarm state.

Example 12 includes the security system of one of Examples 10 or 11, wherein the base station is configured to receive the alarm signal from the at least one sensor and to relay the alarm signal to the base station service, and wherein the base station service is configured to relay the alarm signal to the alarm processing service.

Example 13 includes the security system of any one of Examples 8-12, further comprising a database coupled to the alarm history service, wherein the alarm history service is configured to provide data to the database, the data including a record of the first and second milestones and the command, and wherein the database is configured to store the data.

Example 14 includes the security system of Example 13, wherein the computing system is configured to generate an audit event based on the data, the audit event linking the first and second milestones to the command.

Example 15 includes the security system of any one of Examples 8-14, wherein the at least one sensor includes one or more of a passive infrared motion sensor, a camera, a glass break sensor, an entry sensor, or a panic button.

Example 16 includes the security system of any one of Examples 8-15, wherein the authentication information authenticates the request for the security system to exit the alarm state.

Example 17 provides one or more non-transitory computer readable media storing sequences of instructions executable to control a computer system. The sequences of instructions comprise instructions to receive, by the computer system, a plurality of milestones indicating events in a security system while the security system is in an alarm state at a location remote from the computer system, the plurality of milestones including a first milestone indicative of validity of authentication information, and a second milestone indicative of a request for the security system to exit the alarm state, generate, by the computer system, a command in response to receipt of the first and second milestones, the command including instructions to cause the security system to exit the alarm state upon receipt of the command by at least one device of the security system, and transmit, by the computer system, the command to the at least one device to cause the security system to exit the alarm state.

Example 18 includes the one or more non-transitory computer readable media of Example 17, wherein the sequences of instructions comprise instructions to store data corresponding to the first and second milestones and the command in a database.

Example 19 includes the one or more non-transitory computer readable media of Example 18, wherein the sequences of instructions comprise instructions to generate an audit event based on the data, wherein the audit event links the first and second milestones to the command.

Example 20 includes the one or more non-transitory computer readable media of any one of Examples 17-19, wherein the sequences of instructions comprise instructions to receive, by the computer system, an alarm signal from the at least one device, and prior to generating the command, validate, by the computer system and based on receipt of the alarm signal, that the security system is in the alarm state.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:
1. A method comprising:
receiving, by a first computing device at a first location, a sequence of milestones regarding a security system while the security system is in an alarm state at a second location remote from the first location, the sequence of milestones including first and second milestones indicative of (i) validity of authentication information, and (ii) a request for the security system to exit the alarm state, respectively;

transmitting, by the first computing device, the sequence of milestones to a second computing device located at a third location remote from the first location and the second location;

determining, by the second computing device, that the sequence of milestones was received in a predefined order by the first computing device;

generating, by the second computing device, a command in response to determining that the sequence of milestones was received in the predefined order by the first computing device, the command including instructions to cause the security system to exit the alarm state upon receipt of the command by at least one device of the security system; and transmitting, by the second computing device via a network between the third location and the second location, the command to the at least one device to cause the security system to exit the alarm state.

2. The method of claim 1, further comprising:
receiving, by the second computing device, at least one alarm signal from the at least one device indicating that the security system is in the alarm state; and
generating, in response to receipt of the at least one alarm signal, a third milestone indicating that the security system is in the alarm state.

3. The method of claim 2, further comprising:
prior to generating the command, validating, by the second computing device and based on the third milestone, that the security system is in the alarm state.

4. The method of claim 1, wherein:
the first computing device includes a monitor interface;
the method further includes transmitting, by the second computing device, a signal to the monitor interface, the signal indicating that the security system is in the alarm state; and
receiving the sequence of milestones includes receiving, by the first computing device, the first and second milestones via the monitor interface.

5. The method of claim 1, wherein transmitting the command to the at least one device includes transmitting the command to a base station over a wireless network connection.

6. The method of claim 1, further comprising:
storing data corresponding to the first and second milestones in a database.

7. The method of claim 6, further comprising:
generating an audit event based on the first and second milestones and the command, wherein the audit event links the command to the first and second milestones.

8. A security system comprising:
a plurality of devices disposed at a second location remote from a first location and a third location, the plurality of devices including a base station and at least one sensor configured to produce an alarm signal indicating that the security system is in an alarm state; and
a second computing system disposed at the third location and hosting an alarm history service configured to process a sequence of milestones generated during the alarm state, wherein the alarm history service is configured to receive the sequence of milestones including a first milestone indicative of validity of authentication information and a second milestone indicative of a request for the security system to exit the alarm state, the alarm history service further configured to determine that the sequence of milestones was received via a first computing system at the first location in a predefined order, and generate a command in response to receipt of the sequence of milestones in the predefined order, the command including instructions to cause the security system to exit the alarm state upon receipt of the command by the base station.

9. The security system of claim 8,
wherein the at least one sensor is coupled to the base station;
wherein the second computing system further hosts a base station service configured to relay the command from the alarm history service to the base station via a wireless network connection; and
wherein the base station is configured to transmit the command to the at least one sensor to cause the security system to exit the alarm state.

10. The security system of claim 9, wherein the second computing system further hosts an alarm processing service configured to generate an alarm milestone in response to receiving the alarm signal, the alarm milestone indicating that the security system is the alarm state.

11. The security system of claim 10, wherein the alarm history service is configured to, prior to generating the command, validate based on the alarm milestone, that the security system is in the alarm state.

12. The security system of claim 10, wherein the base station is configured to receive the alarm signal from the at least one sensor and to relay the alarm signal to the base station service; and
wherein the base station service is configured to relay the alarm signal to the alarm processing service.

13. The security system of claim 8, further comprising:
a database coupled to the alarm history service, wherein the alarm history service is configured to provide data to the database, the data including a record of the first and second milestones and the command, and wherein the database is configured to store the data.

14. The security system of claim 13, wherein the second computing system is configured to generate an audit event based on the data, the audit event linking the first and second milestones to the command.

15. The security system of claim 8, wherein the at least one sensor includes one or more of a passive infrared motion sensor, a camera, a glass break sensor, an entry sensor, or a panic button.

16. The security system of claim 8, wherein the authentication information authenticates the request for the security system to exit the alarm state.

17. One or more non-transitory computer readable media storing sequences of instructions executable to control a computer system, the sequences of instructions comprising instructions to:
receive, by the computer system at a first location, a sequence of milestones regarding in a security system while the security system is in an alarm state at a second location remote from the first location, the sequence of milestones including a first milestone indicative of validity of authentication information, and a second milestone indicative of a request for the security system to exit the alarm state;
transmit, by the computer system, the sequence of milestones from the first location and the third location remote from the first location and the second location;
determine, by the computer system, that the sequence of milestones was received in a predefined order at the first location;
generate, by the computer system and in response to a determination that the sequence of milestones was received in the predefined order at the first location, a command including instructions to cause the security system to exit the alarm state upon receipt of the command by at least one device of the security system; and transmit, by the computer system via a network between the third location and the second location, the command to the at least one device to cause the security system to exit the alarm state.

18. The one or more non-transitory computer readable media of claim 17, wherein the sequences of instructions comprise instructions to:

store data corresponding to the first and second milestones and the command in a database.

19. The one or more non-transitory computer readable media of claim 18, wherein the sequences of instructions comprise instructions to:

generate an audit event based on the data, wherein the audit event links the first and second milestones to the command.

20. The one or more non-transitory computer readable media of claim 17, wherein the sequences of instructions comprise instructions to:

receive, by the computer system, an alarm signal from the at least one device; and prior to generating the command, validate, by the computer system and based on receipt of the alarm signal, that the security system is in the alarm state.

* * * * *